US012682616B2

(12) United States Patent
Hur et al.

(10) Patent No.: US 12,682,616 B2
(45) Date of Patent: Jul. 14, 2026

(54) TRAINING SYSTEM FOR COMPUTER VISION MODEL

(71) Applicants: Hyundai Motor Company, Seoul (KR); Kia Corporation, Seoul (KR)

(72) Inventors: Minhoe Hur, Singapore (SG); Keng Teck Ma, Singapore (SG); Evan Ling, Singapore (SG); Dezhao Huang, Singapore (SG)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 426 days.

(21) Appl. No.: 18/508,602

(22) Filed: Nov. 14, 2023

(65) Prior Publication Data

US 2025/0139943 A1      May 1, 2025

(30) Foreign Application Priority Data

Oct. 30, 2023      (KR) ......................... 10-2023-0147105

(51) Int. Cl.
*G06V 10/774* (2022.01)
*G06T 7/11* (2017.01)
(Continued)

(52) U.S. Cl.
CPC .............. *G06V 10/774* (2022.01); *G06T 7/11* (2017.01); *G06T 7/246* (2017.01); *G06V 10/764* (2022.01);
(Continued)

(58) Field of Classification Search
CPC .. G06V 10/774; G06V 10/764; G06V 10/776; G06V 10/7753; G06T 7/11;
(Continued)

(56) References Cited

U.S. PATENT DOCUMENTS

| 12,125,266 B1 * | 10/2024 | Wang ...................... | G06V 10/20 |
| 12,482,078 B2 * | 11/2025 | Kanazawa ............. | G06N 3/045 |

(Continued)

FOREIGN PATENT DOCUMENTS

| JP | 2022-519003 A | 3/2022 |
| KR | 102507273 B1 | 3/2023 |

OTHER PUBLICATIONS

"Occlusion-Ordered Semantic Instance Segmentation" Baselizadeh, et al. arXiv, 2504.14054 https://arxiv.org/abs/2504.14054 (Year: 2025).*

(Continued)

*Primary Examiner* — Wesley J Tucker
(74) *Attorney, Agent, or Firm* — Banner & Witcoff, Ltd.

(57) ABSTRACT

An apparatus may comprise a processor, and memory storing instructions, that when executed by the processor, may cause the apparatus to extract at least one source instance from at least one source image stored in a dataset, arrange the at least one extracted source instance on a target image stored in the dataset, wherein the target image may comprise at least one target instance associated with a ground-truth mask used to recognize the at least one target instance, perform, based on the arrangement, an augmentation process on the target image, adjust the ground-truth mask value based on the performance of the augmentation process, and output the target image including the adjusted ground-truth mask of the target instance.

19 Claims, 6 Drawing Sheets

(51) Int. Cl.
G06T 7/246 (2017.01)
G06V 10/764 (2022.01)
G06V 10/776 (2022.01)

(52) U.S. Cl.
CPC .. G06V 10/776 (2022.01); G06T 2207/20021
(2013.01); G06T 2207/20076 (2013.01); G06T
2207/20081 (2013.01)

(58) Field of Classification Search
CPC .......... G06T 7/246; G06T 2207/20021; G06T
2207/20076; G06T 2207/20081; G06T
7/73; G06T 5/00
See application file for complete search history.

(56) References Cited

U.S. PATENT DOCUMENTS

| | | | | |
|---|---|---|---|---|
| 2019/0311202 A1* | 10/2019 | Lee | ......................... | G06T 9/002 |
| 2021/0150751 A1* | 5/2021 | Liu | ...................... | G06V 30/274 |
| 2021/0319242 A1* | 10/2021 | Cholakkal | .............. | G06V 20/52 |
| 2021/0357684 A1* | 11/2021 | Amirghodsi | ............. | G06N 3/09 |
| 2023/0026278 A1* | 1/2023 | Vianello | .............. | G06V 20/176 |
| 2023/0154139 A1 | 5/2023 | Chen et al. | | |
| 2023/0177824 A1* | 6/2023 | Price | ...................... | G06N 3/045 |
| | | | | 382/157 |
| 2023/0386163 A1* | 11/2023 | Wu | ........................... | G06T 7/62 |
| 2024/0119122 A1* | 4/2024 | Deshmukh | .......... | G06F 18/2411 |
| 2024/0169541 A1* | 5/2024 | Zhang | ....................... | G06T 7/11 |
| 2024/0203152 A1* | 6/2024 | Guo | ....................... | G06V 40/10 |
| 2024/0378844 A1* | 11/2024 | Yu | .............................. | G06T 5/77 |
| 2025/0086760 A1* | 3/2025 | Kanazawa | ................ | G06T 5/77 |
| 2025/0182509 A1* | 6/2025 | Chandrashekar | ........ | G06N 3/09 |
| 2025/0191192 A1* | 6/2025 | Kwong | ................ | G06V 10/806 |
| 2025/0307606 A1* | 10/2025 | Feng | ................... | G06N 3/0455 |
| 2025/0308215 A1* | 10/2025 | Hur | ....................... | G06V 10/774 |

OTHER PUBLICATIONS

"Deep Occlusion-Aware Instance Segmentation with Overlapping BiLayers" Ke et al. Hong Kong University of Science and Technolofy, arXiv, 2103.12340, https://arxiv.org/abs/2103.12340 (Year: 2021).*
Lazarow et al. "Learning Instance Occlusion for Panoptic Segmentation," Computer Vision Foundation, 2020.
Ke et al. "Deep Occlusion-Aware Instance Segmentation with Overlapping BiLayers," Computer Vision Foundation, 2021.
Lin et al. "Microsoft COCO: Common Objects in Context," Feb. 21, 2015.
Bengio et al. "Curriculum Learning," International Conference on Machine Learnng, Montreal, Canada, 2009.
Cheng et al. "Masked-attention Mask Transformer for Universal Image Segmentation," Computer Vision Foundation, 2022.
Chen et al. "MMDetection: Open MMLab Detection Toolbox and Benchmark," Jun. 17, 2019.
Zhang et al. "Pose2Seg: Detection Free human Instance Segmentation," Computer Vision Foundation, 2019.

* cited by examiner

FIG. 3C entire training loss (y-axis) vs probability of arrangement near target instance (x-axis)

FIG. 3D entire training loss (y-axis) vs non-overlapping degree (x-axis)

TRAINING SYSTEM FOR COMPUTER VISION MODEL

CROSS REFERENCE TO RELATED APPLICATION

The present application claims priority to Korean Patent Application No. 10-2023-0147105, filed Oct. 30, 2023, the entire contents of which is incorporated herein for all purposes by this reference.

TECHNICAL FIELD

The present disclosure relates to a training system for a computer vision model, which may improve instance recognition performance for an image having a plurality of overlapping instances of the computer vision model through a data oriented approach.

BACKGROUND

With developments in deep learning, machine learning, and the like, a computer vision model may be used. Computer vision models extract meaningful information from digital images, videos, and other visual inputs and provide the information in a usable form and may be applied to various fields such as vehicles and manufacturing.

Computer vision models may be used to perform tasks such as image classification, object classification on an image, object tracking, and image search. In particular, the object classification may be subdivided into semantic segmentation, which is a method of assigning a class label to each of all unit pixels of the input image, and instance segmentation, which is a method of assigning a class label and unique instance label to each object.

In particular, although the instance segmentation may be used to identify and segment individual object instances within an image, an occlusion instance scenario, in which a multiple instances overlap each other on a target image with partial occlusion, may adversely affect model's ability to accurately recognize each instance.

Therefore, a method to enable accurate instance segmentation even in the occlusion instance scenario is proposed.

The matters explained herein are for the purpose of enhancing the understanding of the present disclosure and should not be taken as acknowledging that they correspond to the related art already known to those skilled in the art.

SUMMARY

According to the present disclosure, an apparatus may comprise: a processor; and memory storing instructions, that when executed by the processor, may cause the apparatus to: extract at least one source instance from at least one source image stored in a dataset; arrange the at least one extracted source instance on a target image stored in the dataset, wherein the target image may comprise at least one target instance associated with a ground-truth mask used to recognize the at least one target instance; perform, based on the arrangement, an augmentation process on the target image; adjust the ground-truth mask based on the performance of the augmentation process; and output the target image including the adjusted ground-truth mask of the target instance.

The apparatus, wherein the at least one source instance belongs to a same object class as the at least one target instance. The apparatus, wherein the instructions, when executed by the processor, may cause the apparatus to perform the augmentation process based on a preset probability.

The apparatus, wherein the instructions, when executed by the processor, may cause the apparatus to perform the augmentation process based on a source instance satisfying at least one filtering condition, wherein the at least one filtering condition may comprise a filtering condition that is satisfied based on a ratio of a size of the source instance to a size of the target image being larger than a preset ratio.

The apparatus, wherein the instructions, when executed by the processor, may cause the apparatus to perform the augmentation process based on a source instance satisfying at least one filtering condition, wherein the at least one filtering condition may comprise a filtering condition that is satisfied based on a number of ground-truth visible key points of the source instance being at least a preset number.

The apparatus, wherein the instructions, when executed by the processor, may cause the apparatus to perform the augmentation process based on a source instance satisfying at least one filtering condition, wherein the at least one filtering condition may comprise a filtering condition that is satisfied based on a number of connected components of a source instance being smaller than a preset number.

The apparatus, wherein the instructions, when executed by the processor, may cause the apparatus to perform the augmentation process by arranging the at least one source instance on the target image so that at least a portion of the target image is occluded by the source instance.

The apparatus, wherein the instructions, when executed by the processor, may cause the apparatus to perform the augmentation process by: adjusting a size of the at least one source instance based on a size of the at least one target instance; and arranging, based on the adjusted size, the at least one source instance on the target image.

The apparatus, wherein the instructions, when executed by the processor, may cause the apparatus to perform the augmentation process by arranging the at least one source instance on the target image so that at least a portion of the at least one target instance is occluded by the at least one source instance.

The apparatus, wherein the instructions, when executed by the processor, may cause the apparatus to: transform the at least one source instance; and arrange the at least one transformed source instance on the target image. The apparatus, wherein the instructions, when executed by the processor, may cause the apparatus to remove the ground-truth mask associated with the at least one target instance based on a proportion of a part of the at least one target instance, which is occluded by the at least one source instance, exceeding a preset proportion.

The apparatus, wherein the instructions, when executed by the processor, may cause the apparatus to remove the at least one target instance from the target image based on a proportion of a part of the at least one target instance, which is occluded by the at least one source instance, exceeding a preset proportion.

The apparatus, wherein the instructions, when executed by the processor, may cause the apparatus to perform the augmentation process according to a preset training difficulty level. The apparatus, wherein the preset training difficulty level is changed based on a preset cycle value.

The apparatus, wherein the preset cycle value is set based on training epochs of a computer vision model trained based on target images stored in the dataset. The apparatus, wherein the preset training difficulty level is changed in an increasing direction based on a preset condition being satisfied.

The apparatus, wherein the preset condition being satisfied is determined based on a comparison of a training loss of a previous training epoch and a training loss of a current training epoch of a computer vision model trained based on target images from the dataset. The apparatus, wherein the preset training difficulty level is changed in an increasing direction up to a preset upper limit based on the preset condition being satisfied.

The apparatus, wherein the instructions, when executed by the processor, may cause the apparatus to train a computer vision model to determine another target image comprising the at least one target instance, wherein the at least one target instance is associated with the adjusted ground-truth mask value; track, based on the machine learning process, a target instance; and output, based on the tracked target instance, a signal to control operation of a device.

BRIEF DESCRIPTION OF THE DRAWINGS

FIGS. 3A, 3B, 3C, and 3D show examples of the adjustment of a training difficulty level through augmentation according to one example of the present disclosure.

DETAILED DESCRIPTION OF THE DISCLOSURE

Figure 1:
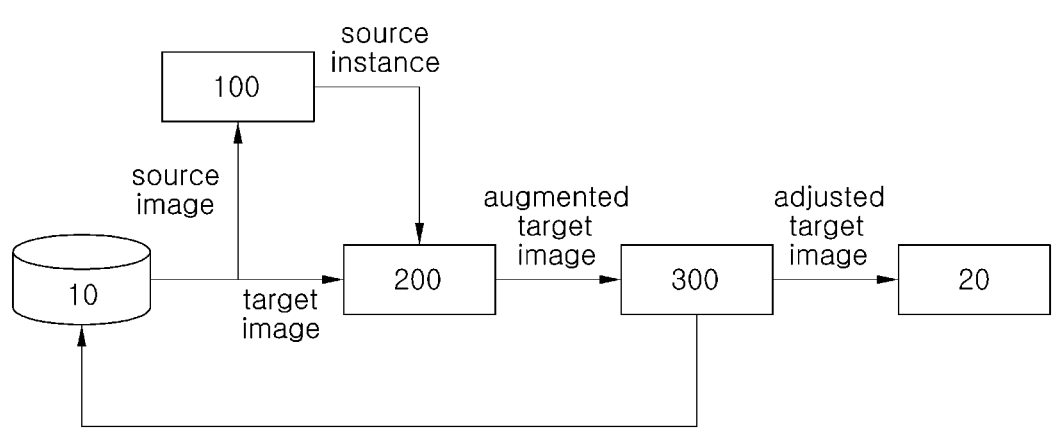
FIG. 1 shows an example of a configuration of a training system for a computer vision model according to one example of the present disclosure.

Specific structural and functional descriptions of the examples of the present disclosure disclosed in the specification or the application are merely illustrative for the purpose of describing the examples of the present disclosure, and the examples of the present disclosure may be implemented in various forms and should not be construed as being limited to the examples described in the specification or the application.

Since the examples of the present disclosure may be variously changed and may have various forms, specific examples will be shown in the drawings and described in detail in the specification or the application. However, it should be understood that this is not intended to limit the present disclosure to a specific form specifying the examples according to the concept of the present disclosure and includes all changes, equivalents, and substitutions included within the spirit and technical scope of the present disclosure.

Unless defined otherwise, all terms used herein, including technical or scientific terms, have the same meaning as commonly understood by those skilled in the art to which the present disclosure pertains. The terms defined in a generally used dictionary should be construed as having meanings that coincide with the meanings of the terms from the context of the related technology and are not construed as an ideal or excessively formal meaning unless clearly defined in this document.

Hereinafter, examples disclosed in this specification will be described in detail with reference to the accompanying drawings, and the same or similar components are denoted by the same reference numerals regardless of the drawing symbols, and overlapping descriptions thereof will be omitted.

In the following description of the examples, the term "preset" means that a value of a parameter is predetermined when using the parameter in a process or an algorithm. According to the examples, the value of the parameter may be set if the process or the algorithm starts or set during a section in which the process or the algorithm is performed.

The suffixes "module" and "unit" for components used in the following description are given or used interchangeably in consideration of ease of preparing the specification and not have meanings or roles that are distinct from each other by themselves.

In describing the examples disclosed in the specification, if it is determined that a detailed description of a related known technology may obscure the gist of the examples disclosed in this specification, a detailed description thereof will be omitted. In addition, the accompanying drawings are only for easy understanding of the examples disclosed in the specification, and it should be understood that the technical spirit disclosed in the specification is not limited by the accompanying drawings, and all changes, equivalents, or substitutes included in the spirit and technical scope of the present disclosure are included in the accompanying drawings.

Terms including ordinal numbers such as first or second may be used to describe various components, but the components are not limited by the terms. The terms are used only for the purpose of distinguishing one component from another.

If a first component is described as being "connected" or "coupled" to a second component, it should be understood that the first component may be directly connected or coupled to the second component or a third component may be present therebetween. On the other hand, if the first component is described as being "directly connected" or "directly coupled" to the second component, it should be understood that the third component is not present therebetween.

The singular expression includes the plural expression unless the context clearly dictates otherwise.

In the specification, it should be understood that terms such as "comprise" or "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

The present disclosure proposes that a training system for a computer vision model according to one example of the present disclosure may augment images of a dataset and provide data for the training of the computer vision model, thereby improving the performance of the computer vision model without additional data collection or labeling.

In particular, therefore, the present disclosure proposes that the apparatus according to one example of the present disclosure may improve instance segmentation performance even in an occlusion instance scenario in which multiple instances overlap each other within an image.

Here, the instance may be an individual object within an image, and a class (e.g., person or dog) representing each type or classification may be assigned to each instance. The present disclosure proposes that the apparatus according to one example of the present disclosure may effectively perform instance segmentation, particularly, in a case in which instances of the same class overlap each other in occlusion instance scenarios.

In addition, in the following description, the instance recognition may be used as meaning including instance segmentation.

FIG. 1 shows an example of a configuration of a training system for a computer vision model according to one example of the present disclosure.

Referring to FIG. 1, the apparatus according to one example of the present disclosure may include a dataset 10, an extraction unit 100, an augmentation unit 200, a training data processing unit 300, and a computer vision model 20. However, FIG. 1 is a view mainly showing components related to the description of one example of the present disclosure and it goes without saying that a real system may include a larger or fewer number of components. Hereinafter, each component will be described.

First, the dataset 10 may include various images, and each image may include at least one instance. The dataset 10 may be implemented by storing collected data in a memory or the like, and in one example of the present disclosure, an already existing open-source dataset may be used. The dataset 10 also contains ground-truth masks (labels) for each of the images. Ground-truth masks comprise of instance-level segmentation mask and object class of each instance in an image. In one example of the present it may also contain ground-truth key point disclosure, information for each instance.

The extraction unit 100 may extract at least one source instance from at least one image included in the pre-stored dataset 10 and for example, sample at least one source image from the dataset 10 and then extract source instances from the at least one sampled source image.

In this case, since the extraction may be implemented by a method of copying the source instance on the target image, source instances on the source image and the copied source instance may coexist.

The augmentation unit 200 may perform the augmentation of a target image including at least one target instance included in the dataset 10 based on the extracted at least one source instance.

Here, the ground-truth mask of the target instance may be an original value or real value of the target instance and may be a result expected to be derived if the computer vision model performs the recognition of the target instance. In other words, if an image recognition result of the computer vision model 20 matches with the ground-truth mask, the recognition may be considered to be successfully performed, and the ground-truth mask may function as a hyper parameter for the training of the computer vision model 20 in that an instance recognition reference of the computer vision model 20 may be changed depending on the ground-truth mask of training data input to the computer vision model 20.

Meanwhile, the source instance is an instance used to process the target image for training the computer vision model 20, the target instances are original instances that are present on the target image, and it may be understood that both source and target instances are targets to be recognized through the computer vision model 20.

In particular, it may be determined that the source instance for the augmentation of the target image belongs to the same object classification, for example, the same class as the target instances, and for example, both the source instance and the target instance may have "human" class.

Meanwhile, the augmentation unit 200 may not always provide an augmented target image, but may provide a mixture of the augmented target image and a non-augmented target image to the training data processing unit 300. In this case, since the augmentation unit 200 may perform the augmentation of the target image based on a preset probability, the augmentation effect may be regularized, thereby improving training performance.

In addition or alternative, instead of using all extracted source instances for augmentation, the augmentation unit 200 may randomly sample a subset of the source instances and also use only source instances that are suitable for the training of the computer vision model 20 for augmentation to derive higher quality training data. In other words, the augmentation unit 200 may perform filtering by determining whether a source instance satisfies at least one preset filtering condition and use only the source instance passing through the filtering to augment the target image.

For example, at least one preset filtering condition may include a first filtering condition that is satisfied if the ratio of the size of the source instance to the size of the target image is larger than a preset ratio, a second filtering condition that is satisfied when the number of ground-truth visible key points of the source instance may be observed to be a preset number or more, a third filtering condition that is satisfied if the number of connected components of the source instance is smaller than a preset number, and the like.

Since an source instance that is too small makes it difficult to bring the context information of the source image to the target image, the augmentation unit 200 may apply the first filtering condition and uses only the source instance having a size suitable for training to augment the target image.

If the source instance includes only a portion of the entire component required for the corresponding class, the source instance is likely to be occluded by other objects on the source image and in this case, may not be suitable for augmentation for training because the occlusion context may not be copied over also. Such partial source instance may be determined by checking the number of ground-truth visible key points of the instance, if key point information is labelled and available in the dataset. Here, the ground-truth visible key points may mean a feature that appears in an image or an instance included in it, and may be used to confirm the ground-truth mask of an instance included in the image. In this case, if the ground-truth visible key points are observed, it may be helpful in confirming the ground-truth mask and if the ground-truth visible key points are not observed, it may be difficult to confirm the ground-truth mask. Therefore, the augmentation unit 200 may apply the second filtering condition and use only the source instance if the number of ground-truth visible key points is observed to be the preset number or more to augment the target image.

In addition or alternative, if the number of connected components of the source instance is large, for example, a whole mask is broken into several connected parts, the source instance is likely to be occluded on the source image and in this case, may not be suitable for augmentation because once again, the context of the source image may not be carried over to the target image during pasting. Therefore, the augmentation unit 200 may apply the third filtering condition and use only the source instance in which the number of connected components of the source instance mask is smaller than the preset number to augment the target image.

Meanwhile, a specific augmentation method of the target image will be described below with reference to FIGS. 2 and 3.

Figure 2:
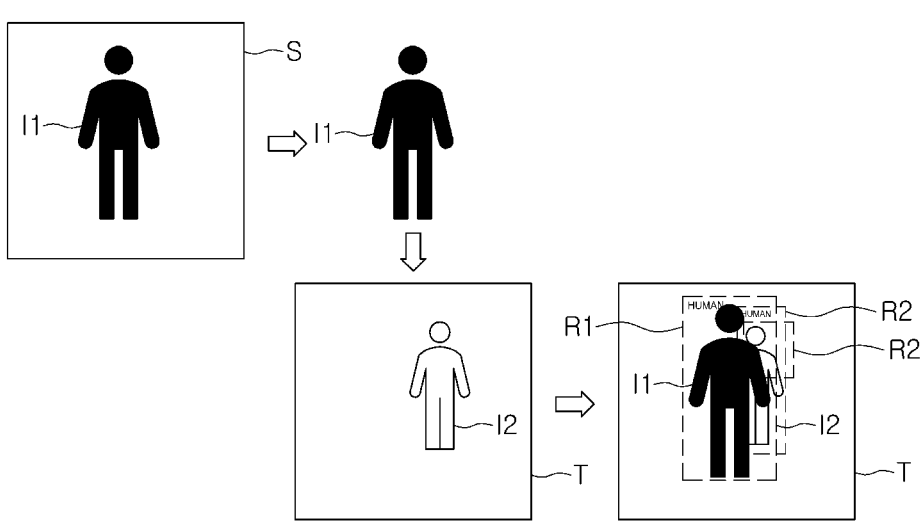
FIG. 2 shows an example of an image augmentation for the training of the computer vision model according to one example of the present disclosure.

Firstly, FIG. 2 shows an example of the image augmentation for the training of the computer vision model according to one example of the present disclosure.

Referring to FIG. 2, first, the extraction unit 100 may randomly sample and extract a source image S, including a source instance I1, from the dataset 10 and extract the source instance I1 from the sampled source image S.

The augmentation unit 200 may perform augmentation by arranging at least one source instance I1 on a target image T so that at least a portion of the target image T having a target instance I2 is occluded by the source instance I1, and thus induce an occlusion instance scenario within the target image T. For example, the augmentation may be performed by a method of pasting the source instance I1 copied from the source image S on the target image T.

According to the augmentation, since the number of target images T having the occlusion instance scenario increases, it is possible to improve the instance recognition performance for the occlusion instance scenario of the computer vision model 20 performing training through the augmented target image T.

If the target image T augmented by applying the source instance I1 is input to the computer vision model 20, as the target instance I2 is initially occluded by the source instance I1, a recognition result R2' in which only a portion of the target instance I2 is recognized may be derived, but a recognition result R2 close to a ground-truth of the target instance I2 may be derived according to repeated training through the input of the augmented target image.

Meanwhile, if the target image T is input to the computer vision model 20, the computer vision model 20 may also recognize the source instance I1, and as the source instance I1 is disposed above the target instance I2 on the target image, the source instance I1 may have the recognition result R1 close to the ground-truth from the beginning of training.

In addition or alternative, the augmentation unit 200 may perform the augmentation by adjusting the size of the source instance I1 based on a size of the target instance I2 and then arrange the augmented source instance I1 on the target image T.

Therefore, the augmented target image T may have a more natural shape, and the source instance I1 may be aligned on the target image T to fit the context of the target image T, and thus high-quality training data may be provided for the training of the computer vision model 20.

In addition or alternative, the augmentation unit 200 may arrange the source instance I1 at any arbitrary point on the target image T, or arrange the source instance I1 in the vicinity of the target image T so that at least a portion of the target instance I2 is occluded by the source instance I1, thereby increasing the probability of occurrence of the occlusion instance scenario. As the probability of occurrence of the occlusion instance scenario of the target image T increases, it is possible to improve the instance recognition performance of the computer vision model 20 in response to the occlusion instance scenario.

In addition or alternative, the augmentation unit 200 may transform the source instance I1 and then arrange the source instance I1 on the target image T, and in this case, the transformation may include color transformation and geometric transformation. Due to the transformation of the source instance I1, it is possible to increase the diversity of the training data.

Meanwhile, referring back to FIG. 1, since the augmentation unit 200 may perform the augmentation of the target image according to a preset training difficulty level, various augmentation results of the target image may be derived. By dynamically adjusting the augmentation training difficulty level as the training progresses from easy to hard, it may be possible that the computer vision model 20 may learn better, in a curriculum learning setting.

In this case, the preset training difficulty level may be changed depending on a preset cycle, and the preset cycle may be set based on the training epochs of the computer vision model 20 trained after receiving target images from the training data processing unit 300.

For example, the training difficulty level may be changed each time all target images of the dataset 10 are input to the computer vision model 20 once.

In addition or alternative, the training difficulty level may be changed in an increasing direction, from easy to hard, if a preset raising condition is satisfied, thereby improving the training efficiency of the computer vision model 20. In this case, it may be determined whether the raising condition is satisfied based on a comparison of a training loss of a previous training epoch and a training loss of a current training epoch of the computer vision model 20 trained after receiving target images from the training data processing unit 300, and for example, if the training loss of the current training epoch is smaller than that of the previous training epoch, a training difficulty level of a next stage may be applied.

However, if the training difficulty level exceeds a specific threshold, the augmented target image may instead hinder the training efficiency, and thus an upper limit of the training difficulty level may be set, and as a result, the augmentation unit 200 may perform the augmentation according to the training difficulty level changed in an increasing direction up to the preset upper limit if the preset raising condition is satisfied.

The adjustment of the training difficulty level through augmentation will be described below with reference to FIGS. 3A to 3D.

FIGS. 3A to 3D show examples of the adjustment of a training difficulty level through augmentation according to one example of the present disclosure.

FIGS. 3A to 3D are graphs each having the entire training loss as a vertical axis against elements related to the adjustment of the difficulty level of augmentation as a horizontal axis. Here, the entire training loss may be reflective of the difficulty level of augmentation, and it may be understood that as the entire training loss increases, augmentation has been performed at a higher difficulty level.

Figure 3A:
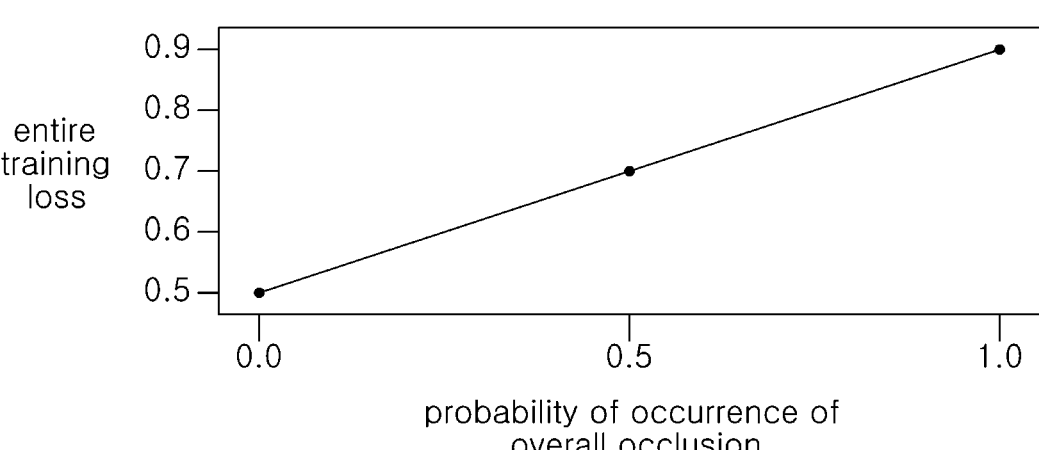

Firstly, referring to FIG. 3A, a graph showing the relationship between the probability of occurrence of the overall occlusion and the entire training loss is shown. As the probability of occurrence of the overall occlusion increases, the probability that the target image provided as the training data has the occlusion instance scenario increases as much as it increases, and the augmentation may be considered to be performed to have a higher training difficulty level. As may be seen from the graph, as the probability of occurrence of the overall occlusion increases, the entire training loss corresponding to the training difficulty level may increase.

Figure 3B:
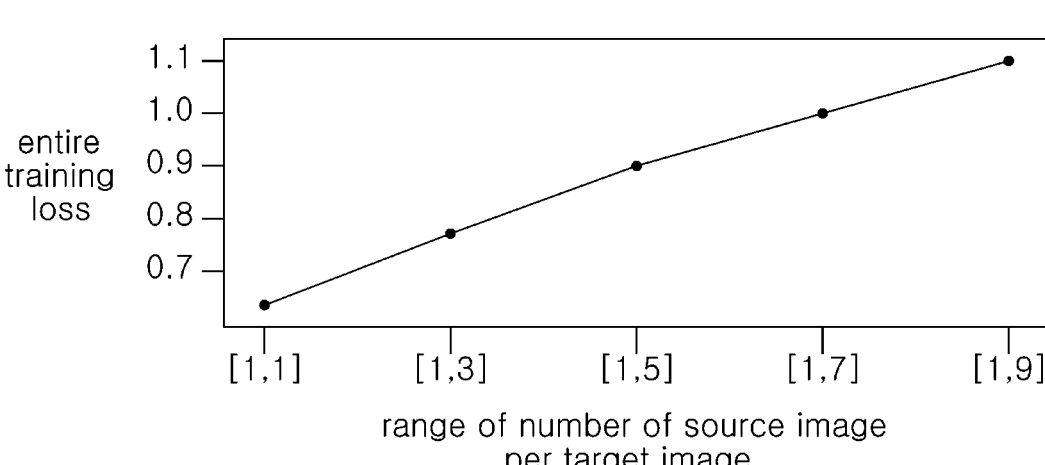

Next, referring to FIG. 3B, a graph showing the relationship between the range of number of source instances to be pasted per target image and the entire training loss is shown. The eventual number of source instance to be pasted on each target image is randomly sampled between this range. As the number of source instances per target image increases, the occlusion worsens, the number of instances to be recognized by the computer vision model 20 increases, and the probability of occlusion between instances may increase, thus raising the training difficulty level. As may be seen from the graph, as the upper limit of the range of the number of source instances per target image increases, the entire training loss corresponding to the training difficulty level may increase.

Figures 3C, 3D:
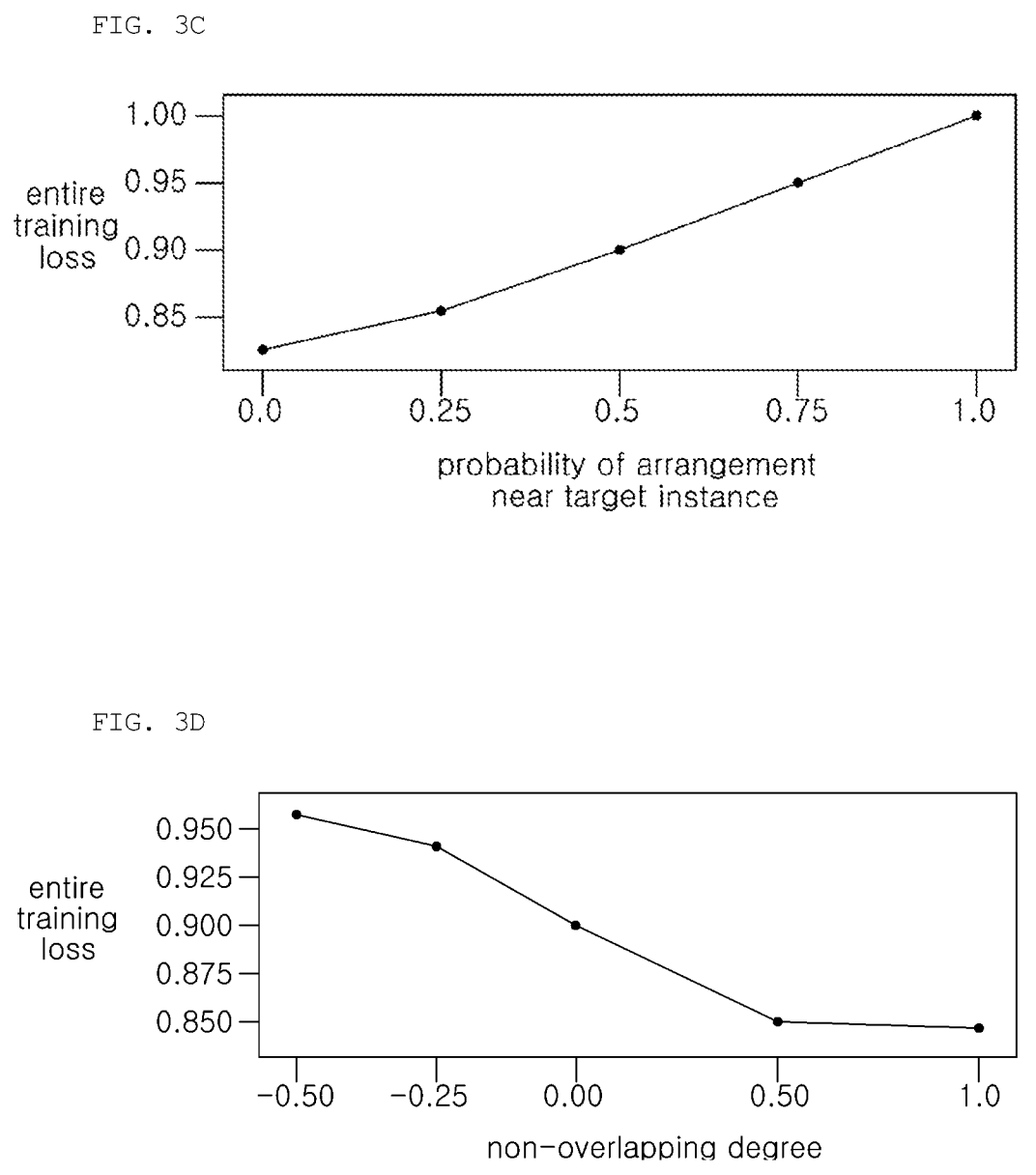

Next, referring to FIG. 3C, a graph showing the relationship between the probability that the source instance is disposed near target existence instances and the entire training loss is shown. As the source instance is disposed near the target instance, the probability of occurrence of occlusion may increase, and thus the training difficulty level may be raised. As may be seen from the graph, as the probability that the source instance is disposed near the target instance increases, the entire training loss corresponding to the training difficulty level may increase.

Next, referring to FIG. 3D, a graph showing the relationship between a non-overlapping degree between the source instance and the target instance and the entire training loss is shown. As the non-overlapping degree between the source instance and the target instance decreases, the probability of higher overlaps in occlusion may increase, and thus the training difficulty level may be raised as much as it increases. As may be seen from the graph, as the non-overlapping degree between the source instance and the target instance decreases, for example, an overlapping degree therebetween increases, the entire training loss corresponding to the training difficulty level may increase.

Meanwhile, referring back to FIG. 1, the training data processing unit 300 may adjust the ground-truth masks of target instances according to an augmentation state of the target image and output the target image having the adjusted ground-truth mask of the target instance.

For example, the training data processing unit 300 may modify the ground-truth mask to the remaining parts to exclude the part of the target instance which is occluded by the source instance, so that the computer vision model 20 may recognize the target instance even in the occlusion instance scenario.

In addition or alternative, if the proportion of the part of the target instance that is occluded by the source instance, exceeds the preset proportion, the training date processing unit 300 may remove the ground-truth mask labeled to the target instance. In this case, since the target instance is rarely observed on the target image, it is possible to mitigate the occurrence of recognition errors by removing the ground-truth mask.

In addition or alternative, if the proportion of the part of the target instance that is occluded by the source instance, exceeds the preset proportion, the training data processing unit 300 may remove the target instance completely to prevent the use of the target image having the target instance with an excessively small observable part due to occlusion as the training data.

Meanwhile, the computer vision model 20 may be trained after receiving the target image output from the training data processing unit and may have a process for at least recognizing an instance on the input image. For example, if an augmented target image is input to the computer vision model 20, the computer vision model 20 may perform a task of recognizing the source instance and the target instance on the target image. If the purpose is to recognize or identify an instance, various types of models may be implemented as the computer vision model 20 according to one example of the present disclosure regardless of a specific implementation method.

Figure 4:
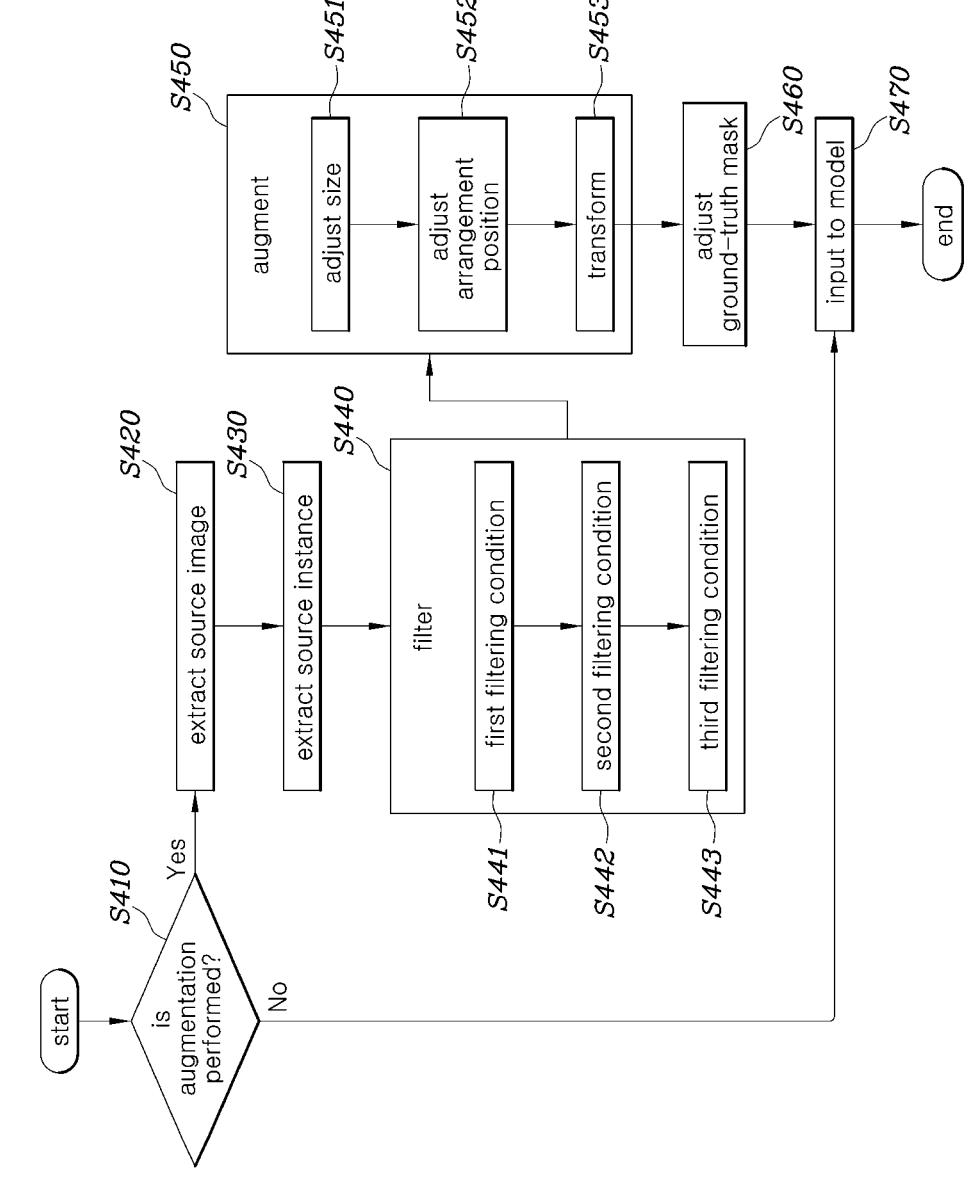
FIG. 4 shows an example of a process of training the computer vision model according to one example of the present disclosure.

FIG. 4 shows an example of a process of training the computer vision model according to one example of the present disclosure.

Firstly, it may be determined whether to perform augmentation according to a preset probability, and for example, the augmentation may be performed with a 50% probability. If it is determined to perform the augmentation (YES in S410), the extraction unit 100 may first random sample and extract source images from the dataset 10 (S420) and extract source instances from the sampled source images (S430).

The augmentation unit 200 may apply the source instance passing through filtering (S440) to the target image and perform the augmentation of the target image (S450).

For example, in the filtering (S440), at least one of determining the first filtering condition related to the size of the source instance (S441), determining the second filtering condition related to the number of ground-truth visible key points of the source instance (S442), and determining the third filtering condition related to the number of connected components of the source instance (S443).

In addition or alternative, in the augmentation (S450), at least one of adjusting the size of the source instance (S451), adjusting an arrangement position on the target image (S452), and transforming the source instance (S453) may be performed.

Meanwhile, the training data processing unit 300 receiving the augmented target image may adjust the ground-truth mask of the target instance according to the augmentation state of the target image (S460), output the target image, which is augmented and has the adjusted ground-truth mask.

In addition or alternative, the target image, which is augmented and has the adjusted ground-truth mask, may be input to the computer vision model 20 as the training data and used for the training of the computer vision model 20 (S470).

Figure 5:
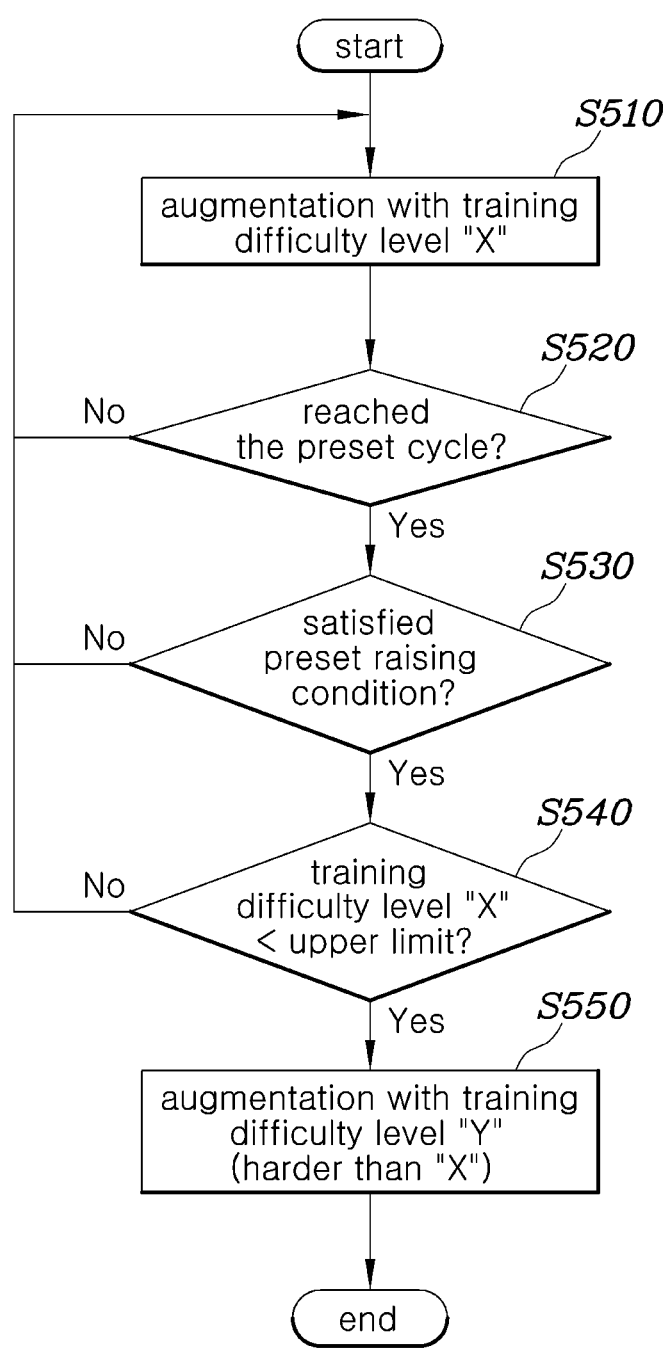
FIG. 5 shows an example of a process of adjusting the training difficulty level of augmentation according to one example of the present disclosure.

FIG. 5 shows an example of a process of adjusting the training difficulty level of augmentation according to one example of the present disclosure.

Referring FIG. 5, the augmentation unit 200 may perform the augmentation of the target image according to a preset training difficulty level "X" (S510). The preset training difficulty level "X" may be varied, thus, various augmentation results of the target image may be derived. By dynamically adjusting the augmentation training difficulty level as the training progresses from easy to hard, it may be possible that the computer vision model 20 may learn better, in a curriculum learning setting.

In this case, the preset training difficulty level may be changed depending on a preset cycle. More specifically the training difficulty level may be changed on a condition that the preset cycle is reached (Yes of S520).

The preset cycle may be set based on the training epochs of the computer vision model 20 trained after receiving target images from the training data processing unit 300. For example, the training difficulty level may be changed each time all target images of the dataset 10 are input to the computer vision model 20 once.

In addition or alternative, the training difficulty level may be changed in an increasing direction, from easy to hard, on a condition that a preset raising condition is satisfied (Yes of S530), thereby improving the training efficiency of the computer vision model 20. In this case, it may be determined whether the raising condition is satisfied based on a comparison of a training loss of a previous training epoch and a training loss of a current training epoch of the computer vision model 20 trained after receiving target images from the training data processing unit 300, and for example, if the training loss of the current training epoch is smaller than that of the previous training, a training difficulty level of a next stage may be applied.

However, if the training difficulty level exceeds a specific threshold, the augmented target image may instead hinder the training efficiency, and thus an upper limit of the training difficulty level may be set. More specifically, the training difficulty level may be raised on a condition that current training difficulty level ("X") is lower (easier) than the preset upper limit (Yes of S540). As a result, the augmentation unit 200 may perform the augmentation according to the training difficulty level changed in an increasing direction within the preset upper limit if the preset raising condition is satisfied.

If all conditions for raising the training difficulty level are satisfied (Yes in S520, S530 and S540), the training difficulty level "X" may be changed to training difficulty level "Y" which is harder than training difficulty level "X" (S550).

The present disclosure is directed to providing a training system for a computer vision model, which may allow instance segmentation to be effectively performed in an occlusion instance scenario without additional data collection or labeling.

The objective of the present disclosure is not limited to the above-described object, and other objectives that are not mentioned will be able to be clearly understood by those skilled in the art from the following description.

A training system for a computer vision model according to one example of the present disclosure for achieving the objective includes an extraction unit configured to extract at least one source instance from at least one image included in a pre-stored training dataset, an augmentation unit configured to apply the extracted source instances (at least one) to the target image containing at least one target instance from the same training dataset, labeled with ground-truth masks and perform augmentation of a target image, and a training data processing unit configured to adjust the ground-truth masks of the target instances according to the applied source instances.

For example, the source instance may belong to the same object class as the target instance.

For example, the augmentation unit may perform the augmentation of the target image based on a preset probability.

For example, the augmentation unit may perform the augmentation based on the source instances satisfying at least one filtering condition including a source instance filtering condition that is satisfied if the ratio of the size of the source instance to the size of the target image is larger than a preset ratio.

For example, the augmentation unit may perform the augmentation based on the source instances satisfying at least one filtering condition including a second filtering condition that is satisfied if the number of ground-truth visible key points of the source instance is observable to be a preset number or more.

For example, the augmentation unit may perform the augmentation based on the source instances satisfying at least one filtering condition including a third filtering condition that is satisfied if the number of connected components in the mask of source instance is smaller than a preset number.

For example, the augmentation unit may perform the augmentation by arranging the source instances on the target image such that at least a portion of the target image is occluded by the source instances.

For example, the augmentation unit may adjust the size of the source instance based on the size of the target instance and then arrange the source instance on the target image.

For example, the augmentation unit may arrange a source instance on the target image so that at least a portion of a target instance is occluded by the source instance.

For example, the augmentation unit may apply color transformation and geometrical transformation augmentation on the source instance and then arrange the source instance on the target image.

For example, the training data processing unit may remove a ground-truth mask associated to the target instance if the proportion of its part occluded by the source instance exceeds a preset proportion.

For example, the training data processing unit may output a target image having the adjusted ground-truth mask of the target instance.

For example, the augmentation unit may perform the augmentation of the target images with dynamically changing training difficulty level.

For example, the training difficulty level may be changed depending on a preset scheduled cycle.

For example, the preset cycle may be set based on the training epochs of the computer vision model trained after receiving target images from the training data processing unit.

For example, the training difficulty level may be changed in an increasing direction if a preset raising condition is satisfied.

For example, it may be determined whether the preset raising condition is satisfied based on a comparison of a training loss of a previous training epoch and a training loss of a current training epoch of the computer vision model trained after receiving target images from the training data processing unit.

For example, the preset training difficulty level may be changed in an increasing direction within a preset upper limit if the preset raising condition is satisfied.

For example, the apparatus may further include a computer vision model trained after receiving the target image output from the training data processing unit and having a process for at least recognizing an instance on the input image.

According to various examples of the present disclosure, by training the computer vision model through the data processed by using the dataset, it is possible to improve instance recognition performance in response to the occlusion instance scenario even without additional data collection or labeling.

In addition, since the training system for the computer vision model is implemented by the data oriented approach, the training system for the computer vision model may be used in various manners regardless of various types of computer vision models.

The effects obtainable from the present disclosure are not limited to the above-described effects, and other effects that are not mentioned will be able to be clearly understood by those skilled in the art to which the present disclosure pertains from the following description.

The operations of the method or the algorithm described in connection with the examples disclosed herein may be embodied directly in hardware or a software module executed by a processor, or in a combination thereof. The processor may be a central processing unit (CPU) or a semiconductor device that processes instructions stored in memory and/or a storage. The memory and the storage may include various types of volatile or non-volatile storage media. For example, the memory may include a read only memory (ROM) and a random access memory (RAM). A software module may reside on a storage medium such as a RAM, a flash memory, a ROM, an EPROM, an EEPROM, a register, a hard disc, a removable disk, and a CD-ROM. The exemplary storage medium may be coupled to the processor. The processor may read out information from the storage medium and may write information in the storage medium. Alternatively or additionally, the storage medium may be integrated with the processor. The processor and the storage medium may reside in an application specific integrated circuit (ASIC). The ASIC may reside within a passenger terminal. In another case, the processor and the storage medium may reside in the user terminal as separate components.

According to various examples of the present disclosure, by training the computer vision model through the data processed by using the dataset, it is possible to improve instance recognition performance in response to the occlusion instance scenario even without additional data collection or labeling.

In addition or alternative, since the training system for the computer vision model is implemented by the data oriented approach, the training system for the computer vision model may be used in various manners regardless of various types of computer vision models.

Although the specific examples of the present disclosure have been shown and described above, it will be apparent to those skilled in the art that the present disclosure may be variously improved and changed without departing from the technical spirit of the present disclosure provided by the appended claims.

What is claimed is:

1. An apparatus comprising:
a processor; and
memory storing instructions, that when executed by the processor, cause the apparatus to:
extract at least one source instance from at least one source image stored in a dataset;
arrange the at least one extracted source instance on a target image stored in the dataset, wherein the target image comprises at least one target instance associated with a ground-truth mask used to recognize the at least one target instance;
perform, based on the arrangement, an augmentation process on the target image;
adjust the ground-truth mask based on the performance of the augmentation process; and
output the target image including the adjusted ground-truth mask of the target instance.

2. The apparatus according to claim 1, wherein the at least one source instance belongs to a same object class as the at least one target instance.

3. The apparatus according to claim 1, wherein the instructions, when executed by the processor, cause the apparatus to perform the augmentation process based on a preset probability.

4. The apparatus according to claim 1, wherein the instructions, when executed by the processor, cause the apparatus to perform the augmentation process based on a source instance satisfying at least one filtering condition, wherein the at least one filtering condition comprises a filtering condition that is satisfied based on a ratio of a size of the source instance to a size of the target image being larger than a preset ratio.

5. The apparatus according to claim 1, wherein the instructions, when executed by the processor, cause the apparatus to perform the augmentation process based on a source instance satisfying at least one filtering condition, wherein the at least one filtering condition comprises a filtering condition that is satisfied based on a number of ground-truth visible key points of the source instance being at least a preset number.

6. The apparatus according to claim 1, wherein instructions, when executed by the processor, cause the apparatus to perform the augmentation process based on a source instance satisfying at least one filtering condition, wherein the at least one filtering condition comprises a filtering condition that is satisfied based on a number of connected components of a source instance being smaller than a preset number.

7. The apparatus according to claim 1, wherein the instructions, when executed by the processor, cause the apparatus to perform the augmentation process by arranging the at least one source instance on the target image so that at least a portion of the target image is occluded by the source instance.

8. The apparatus according to claim 7, wherein the instructions, when executed by the processor, cause the apparatus to perform the augmentation process by:
adjusting a size of the at least one source instance based on a size of the at least one target instance; and
arranging, based on the adjusted size, the at least one source instance on the target image.

9. The apparatus according to claim 7, wherein the instructions, when executed by the processor, cause the apparatus to perform the augmentation process by arranging the at least one source instance on the target image so that at least a portion of the at least one target instance is occluded by the at least one source instance.

10. The apparatus according to claim 7, wherein the instructions, when executed by the processor, cause the apparatus to:
transform the at least one source instance; and
arrange the at least one transformed source instance on the target image.

11. The apparatus according to claim 7, wherein the instructions, when executed by the processor, cause the apparatus to remove the ground-truth mask associated with the at least one target instance based on a proportion of a part of the at least one target instance, which is occluded by the at least one source instance, exceeding a preset proportion.

12. The apparatus according to claim 7, wherein instructions, when executed by the processor, cause the apparatus to remove the at least one target instance from the target image based on a proportion of a part of the at least one target instance, which is occluded by the at least one source instance, exceeding a preset proportion.

13. The apparatus according to claim 1, wherein the instructions, when executed by the processor, cause the apparatus to perform the augmentation process according to a preset training difficulty level.

14. The apparatus according to claim 13, wherein the preset training difficulty level is changed based on a preset cycle value.

15. The apparatus according to claim 14, wherein the preset cycle value is set based on training epochs of a computer vision model trained based on target images stored in the dataset.

16. The apparatus according to claim 14, wherein the preset training difficulty level is changed in an increasing direction based on a preset condition being satisfied.

17. The apparatus according to claim 16, wherein the preset condition being satisfied is determined based on a comparison of a training loss of a previous training epoch and a training loss of a current training epoch of a computer vision model trained based on target images from the dataset.

18. The apparatus according to claim 16, wherein the preset training difficulty level is changed in an increasing direction up to a preset upper limit based on the preset condition being satisfied.

19. The apparatus according to claim 1, wherein the instructions, when executed by the processor, cause the apparatus to train a computer vision model to determine another target image comprising the at least one target instance, wherein the at least one target instance is associated with the adjusted ground-truth mask;

track, based on a machine learning process, a target instance; and output, based on the tracked target instance, a signal to control operation of a device.

\* \* \* \* \*